United States Patent
Wang et al.

(10) Patent No.: US 7,746,759 B2
(45) Date of Patent: *Jun. 29, 2010

(54) PILOT PATTERN DESIGN FOR AN OFDM SYSTEM

(75) Inventors: Zhaocheng Wang, Stuttgart (DE); Richard Stirling-Gallacher, Stuttgart (DE)

(73) Assignee: Sony Deutschland GmbH, Cologne (DE)

( * ) Notice: Subject to any disclaimer, the term of this patent is extended or adjusted under 35 U.S.C. 154(b) by 0 days.

This patent is subject to a terminal disclaimer.

(21) Appl. No.: 12/250,306

(22) Filed: Oct. 13, 2008

(65) Prior Publication Data

US 2009/0041142 A1    Feb. 12, 2009

Related U.S. Application Data

(62) Division of application No. 11/338,644, filed on Jan. 25, 2006, which is a division of application No. 09/898,389, filed on Jul. 3, 2001, now Pat. No. 7,221,645.

(30) Foreign Application Priority Data

Jul. 5, 2000   (EP) .................. 00114423

(51) Int. Cl.
*H04J 11/00* (2006.01)
*H04J 4/00* (2006.01)
(52) U.S. Cl. .................. 370/203; 370/208; 370/478; 375/347
(58) Field of Classification Search .......... 370/203, 370/208, 343, 345, 478, 480; 375/148, 347
See application file for complete search history.

(56) References Cited

U.S. PATENT DOCUMENTS 5,867,478 A    2/1999    Baum et al.

(Continued)

FOREIGN PATENT DOCUMENTS

EP    0 810 742 A2    12/1997

(Continued)

OTHER PUBLICATIONS

U.S. Appl. No. 12/251,177, filed Oct. 14, 2008, Wang, et al.

(Continued)

*Primary Examiner*—Hong Cho
*Assistant Examiner*—Saba Tsegaye
(74) *Attorney, Agent, or Firm*—Oblon, Spivak, McClelland, Maier & Neustadt, L.L.P.

(57) ABSTRACT

A transmitting device for transmitting data symbols and pilot symbols in an OFDM transmission system; the device comprising symbol generating means for generating said data symbols and said pilot symbols, means for transmitting said data symbols and pilot symbols respectively by using a plurality of subcarriers of said OFDM transmission system, wherein said symbol generating means is designed to selectively generate a first type pilot symbol and a second type pilot symbol being orthogonal to said first type pilot symbol so that a pilot symbol pattern in the frequency dimension comprises at least said first type pilot symbol to be transmitted by using a predefined subcarrier and second type pilot symbol to be transmitted by using other predefined subcarrier, and wherein said pilot symbol pattern has a different pattern from a succeeding pilot symbol pattern in time dimension.

30 Claims, 2 Drawing Sheets

U.S. PATENT DOCUMENTS

| | | | |
|---|---|---|---|
| 6,005,876 | A | 12/1999 | Cimini, Jr. et al. |
| 6,618,454 | B1 | 9/2003 | Agrawal et al. |
| 6,643,338 | B1 | 11/2003 | Dabak et al. |
| 6,654,339 | B1 | 11/2003 | Bohnke et al. |
| 6,728,302 | B1 | 4/2004 | Dabak et al. |
| 6,795,392 | B1 | 9/2004 | Li et al. |
| 6,853,689 | B1 | 2/2005 | Nilsson |
| 6,961,364 | B1 | 11/2005 | Laroia et al. |
| 7,006,579 | B2 * | 2/2006 | Kuchi et al. ............... 375/295 |
| 7,068,628 | B2 | 6/2006 | Li et al. |
| 7,149,253 | B2 | 12/2006 | Hosur |
| 7,292,651 | B2 | 11/2007 | Li |
| 2002/0041635 | A1 * | 4/2002 | Ma et al. ................... 375/267 |

FOREIGN PATENT DOCUMENTS

| | | |
|---|---|---|
| EP | 0 876 002 A2 | 11/1998 |
| EP | 0 898 381 A2 | 2/1999 |
| EP | 0 938 208 | 8/1999 |
| EP | 0 993 129 A2 | 12/2000 |
| WO | WO 98/38758 | 9/1998 |
| WO | WO 98/59450 | 12/1998 |

OTHER PUBLICATIONS

U.S. Appl. No. 12/250,295, filed Oct. 13, 2008, Wang, et al.

Ayman F. Naguib et al., "Space-Time Coding and Signal Processing for High Data Rate Wireless Communications", IEEE Signal Processing Magazine, vol. 17, No. 3, May 2000, pp. 76-92.

Fredrik Tufvesson et al., "Pilot Assisted Channel Estimation for OFDM in Mobile Cellular Systems", Vehicular Technology Conference, vol. 3, May 4, 1997, pp. 1639-1643.

Tai-Ann Chen et al., "Two Dimensional Space-Time Pilot Symbol Assisted Demodulation over Frequency Nonselective Rayleigh Fading Channels", Wireless Communications and Networking Conference, Sep. 21, 1999, pp. 1065-1069.

Vahid Tarokh, et al., "Space-Time Codes for High Data Rate Wireless Communication: Performance Criterion and Code Construction", IEEE Transactions on Information Theory, vol. 44, No. 2, Mar. 1998, pp. 744-765.

Ayman F. Naguib, et al., "A Space-Time Coding Modem for High-Data-Rate Wireless Communications", IEEE Journal On Selected Areas In Communications, vol. 16, No. 8, Oct. 1998, pp. 1459-1478.

"TS 25.211" V3.0.0 (Oct. 1999), Technical Specification, 3rd Generation Partnership Project (3GPP); Technical Specification Group (TSG) Radio Access Network (RAN); Working Group 1 (WG1); Physical channels and mapping of transport channels onto physical channels (FDD), TSG RAN Meeting No. 5, October, Kyongju, Korea, pp. 1-38.

Ye (Geoffrey) Li, et al., "Transmitter Diversity for OFDM Systems and Its Impact on High-Rate Data Wireless Networks", IEEE Journal on Selected Areas in Communications, vol. 17, No. 7, Jul. 1999, pp. 1233-1243.

Dakshi Agrawal, et al., "Space-Time Coded OFDM for High Date-Rate Wireless Communication Over Wideband Channels", IEEE, VTC '98, 1998, pp. 2232-2236.

"ETSI EN 300 744" V1.5.1 (Jun. 2004), European Standard (Telecommunications series), Digital Video Broadcasting (DVB); Framing structure, channel coding and modulation for digital terrestrial television, European Broadcasting Union, pp. 1-64.

Frederick W. Vook, et al., "Technical Diversity Schemes for Broadband Mobile Communication Systems", IEEE, VTC 2000, pp. 2523-2529.

Siavash M. Alamouti; "A Simple Transmit Diversity Technique for Wireless Communication", IEEE Journal on Select Areas in Communcation, vol. 16, No. 8, Oct. 1998, pp. 1451-1485.

Z. Liu, G. B. Giannakis, A. Scaglione, S. Barbarossa; "Decoding and Equalization of Unknown Multipath Channels Based on Block Precoding and Transmit-Antenna Diversity"; Dept. of ECE, Univ. of Minnesota; 200 Union Str. SE, Minneapolis, MN 55455, pp. 1557-1561.

* cited by examiner

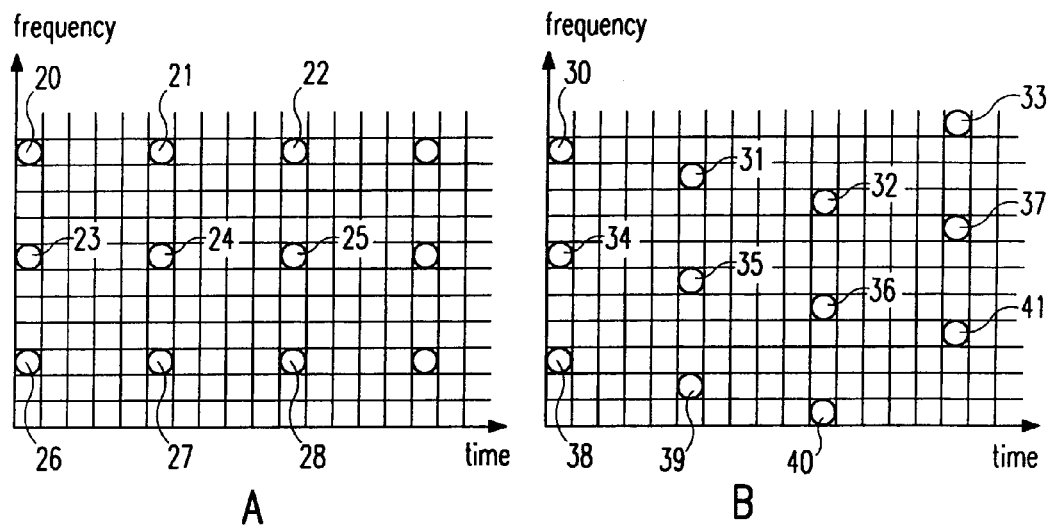
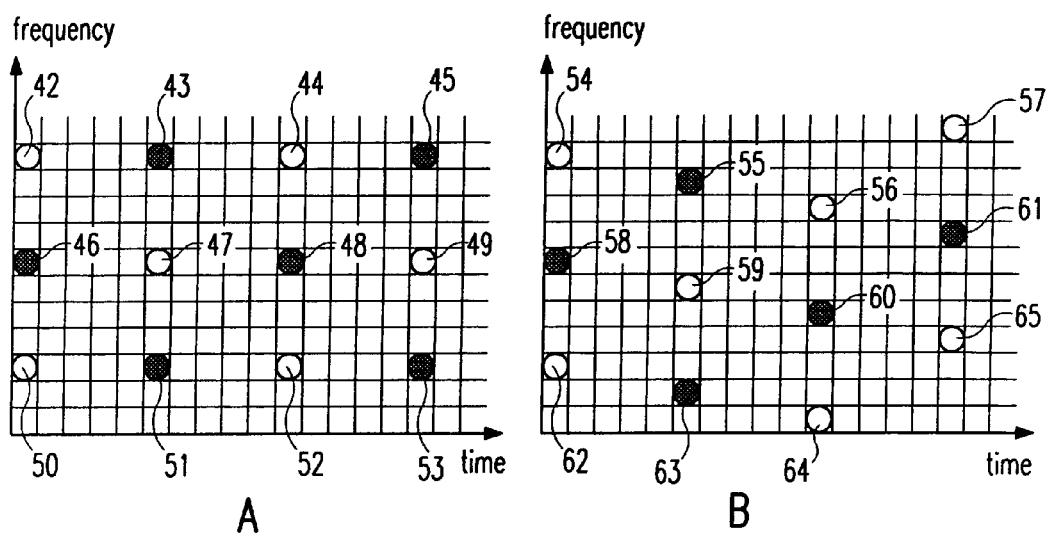

PILOT PATTERN DESIGN FOR AN OFDM SYSTEM

CROSS-REFERENCE TO RELATED APPLICATIONS

This application is a divisional of U.S. application Ser. No. 11/338,644, filed Jan. 25, 2006, which is a divisional of U.S. application Ser. No. 09/898,389 filed Jul. 3, 2001, now U.S. Pat. No. 7,221,645 and claims the benefit of priority from European Patent Application No. 00 114 423.7, filed Jul. 5, 2000, the entire contents of each of which are incorporated herein by reference.

BACKGROUND OF THE INVENTION

1. Field of the Invention

The present invention relates to a transmitting device and a receiving device of a wireless orthogonal frequency division multiplex (OFDM) communication system.

2. Description of the Related Art

In wireless telecommunication, the transmission quality between a transmitting device, such as a base station, and a receiving device, such as a mobile terminal, depends strongly on the respective transmission environment and is often deteriorated by fading effects and the like. This often leads to poor speech and data transmission quality, particularly if only one single antenna is used on the transmission side and one single antenna is used on the receiving side. Therefore, some mobile terminals for wireless telecommunication systems, such as the GSM system, comprise two or more and different kinds of antennas built as internal or external antennas in the mobile terminal. However, it is desirable that modern mobile terminals are as small and light as possible and therefore it is an increasing interest to use only a single antenna in these mobile terminals. In order to allow the use of only a single antenna on the receiving side, particularly the mobile terminal side, it has been proposed to use more than one antenna on the transmitting side, particularly the base station side, so that the diversity gain can be used for a better transmission quality. This scheme is called transmit diversity. Transmit diversity generally means that more than one antenna, e.g. two antennas, transmit data simultaneously to a receiving device. If the same data are transmitted in parallel by two antennas, the receiving side has a chance to receive signals at least from one of the antennas with an acceptable transmission quality so that a good connection can be ensured. One specific approach in the transmit diversity scheme is the use of a so-called space time coding. The resulting space time transmit diversity (STTD) has been adapted and is of the UMTS standard for the next generation of mobile telecommunication part In a space time transmit diversity system, a transmitting device, such as a base station, comprises e.g. two antennas arranged spaced apart from each other in a space diversity arrangement. A stream of data to be transmitted to a receiving device, such as a mobile terminal, is encoded and processed so that two parallel data streams are generated. After further processing corresponding to the respective wireless communication system, the data of each of the two data streams are transmitted by a respective one of the two antennas. Although generally the same data content is transmitted by each of the two antennas, the signals transmitted by the two antennas are not absolutely identical, but data symbols to be transmitted are mapped or coded slightly differently on the signals transmitted by each of the antennas. This allows a receiving device receiving the signals transmitted from the two antennas with only a single antenna to distinguish and separate signals coming from one of the transmitting antennas from signals coming from the other of the transmitting antennas. Since the two transmitting antennas are arranged in a space diversity arrangement, cross interference is avoided and the receiving device can then, after a corresponding channel estimation, distinguish and combine the signals from the two transmitting antennas to obtain a better transmission quality. The channel estimation in the receiving device is usually performed on the basis of pilot symbols transmitted from the transmitting device. The receiving device performs a channel estimation by comparing received pilot symbols with an expected pilot symbol to measure the channel response and to tune the receiving device to the best transmission channel, i.e. the transmitting antenna to which the better connection exists.

The above-mentioned UMTS system bases on a code division multiple access (CDMA) scheme. The CDMA scheme is only one of several possible multiple access schemes used in wireless telecommunication. For wireless telecommunication with high data rates, the orthogonal frequency division multiplex (OFDM) scheme is known, in which the available frequency band used for a communication is divided in a plurality of frequency subcarriers, whereby adjacent frequency subcarriers are respectively orthogonal to each other.

SUMMARY OF THE INVENTION

The object of the present invention is now to propose a transmitting device, which allows a simple and effective channel estimation to be performed.

This object is achieved by a transmitting device according to the independent claims.

The present invention relates to a transmitting device for transmitting data symbols and pilot symbols in an OFDM transmission system; the device comprising symbol generating means for generating said data symbols and said pilot symbols, means for transmitting said data symbols and pilot symbols respectively by using a plurality of subcarriers of said OFDM transmission system, wherein said symbol generating means is designed to selectively generate a first type pilot symbol and a second type pilot symbol being orthogonal to said first type pilot symbol so that a pilot symbol pattern in the frequency dimension comprises at least said first type pilot symbol to be transmitted by using a predefined subcarrier and second type pilot symbol to be transmitted by using other predefined subcarrier, and wherein said pilot symbol pattern has a different pattern from a succeeding pilot symbol pattern in time dimension.

The present invention further relates to a transmitting device for transmitting data symbols and pilot symbols in an OFDM transmission system; the device comprising symbol generating means for generating said data symbols and said pilot symbols, means for transmitting said data symbols and pilot symbols by using a plurality of subcarriers of said OFDM transmission system, wherein said symbol generating means is designed to selectively generate a first type pilot symbol and a second type pilot symbol being orthogonal to said first type pilot symbol so as to create a pilot symbol pattern in which said first and second type pilot symbols are allocated respectively in said frequency dimension, and wherein said pilot symbol pattern has a different pattern from a succeeding pilot symbol pattern in time dimension.

The present invention further relates to a transmitting device for transmitting data symbols and pilot symbols in an OFDM transmission system; the device comprising symbol generating means for generating said data symbols and said pilot symbols, means for transmitting said data symbols and pilot symbols by using a plurality of subcarriers of said OFDM transmission system, wherein said symbol generating means is designed to regularly allocate either a first type pilot symbol or a second type pilot symbol being orthogonal to said first type pilot symbol in the frequency dimension to said generated pilot symbols.

The present invention further relates to a transmitting device for transmitting data symbols and pilot symbols in an OFDM transmission system; the device comprising symbol generating means for generating said data symbols and said pilot symbols, means for transmitting said data symbols and pilot symbols respectively by using a plurality of subcarriers of said OFDM transmission system, wherein said symbol generating means is designed to selectively generate a first type pilot symbol and a second type pilot symbol being orthogonal to said first type pilot symbol so that a pilot symbol pattern in the time dimension comprises at least said first and second type pilot symbols to be transmitted at different timepoints respectively, wherein said pilot symbol pattern to be transmitted by using one of said plurality of subcarriers is different from a pilot symbol pattern to be transmitted by using an adjacent subcarrier.

The present invention further relates to a transmitting device for transmitting data symbols and pilot symbols in an OFDM transmission system; the device comprising symbol generating means for generating said data symbols and said pilot symbols, means for transmitting said data symbols and pilot symbols by using a plurality of subcarriers of said OFDM transmission system, wherein said symbol generating means is designed to selectively generate a first type pilot symbol and a second type pilot symbol being orthogonal to said first type pilot symbol so as to create a pilot symbol pattern in which said first and second type pilot symbols are allocated regularly in the time dimension, and wherein said pilot symbol pattern to be transmitted by using one of said plurality of subcarriers is different from a pilot symbol pattern to be transmitted by using an adjacent subcarrier.

The present invention further relates to a transmitting device for transmitting data symbols and pilot symbols in an OFDM transmission system; the device comprising symbol generating means for generating said data symbols and said pilot symbols, means for transmitting said data symbols and pilot symbols by using a plurality of subcarriers of said OFDM transmission system, wherein a pilot symbol pattern, in which a first type pilot symbol and a second type pilot symbol being orthogonal to said first type pilot symbol are allocated in the time dimension, to be transmitted by using one of said plurality of subcarriers is different from a pilot symbol pattern to be transmitted by using an adjacent subcarrier.

Advantageously, corresponding first and second pilot symbols have the same frequency and time allocation in the OFDM system. In other words, corresponding first and second pilot symbols are transmitted in the same subcarrier and the same timeslot of the OFDM system. Hereby, further advantageously corresponding first and second pilot symbols having the same frequency and time allocation are alternatingly identical and orthogonal to each other in the frequency as well as in the time dimension. This means that in the frequency and time grid of the OFDM system, identical first and second pilot symbols and orthogonal first and second pilot symbols alternate with each other in the frequency as well as the time dimension.

Advantageously, pairs of first pilot symbols being adjacent in the time dimension are respectively orthogonal to the corresponding pairs of second pilot symbols.

Advantageously, pairs of first pilot symbols being adjacent in the frequency dimension are respectively orthogonal to the corresponding pairs of second pilot symbols.

Advantageously, the first and the second pilot symbols have a regular distribution in the time and the frequency dimension, whereby the second pilot symbols alternately have the identical and the inverse complex value of the corresponding first pilot symbol in the time as well as in the frequency dimension.

The proposed scheme of transmitting, receiving and processing first and second pilot symbols allows a simple and effective channel estimation processing to be performed on the receiving side so that a better coherent demodulation of the transmission channel can be performed to ensure the best transmission quality. In an advantageous aspect, the present invention ensures full space and time diversity. Further, no feedback information from the receiving side to the transmitting side is required and an improved data transmission capacity can be realised. Further, the proposed system is robust to transmission antenna failures and guarantees power amplifier balance on the transmitting side.

It has to be clarified at this point that the single antenna of a receiving device receives the first pilot symbols transmitted from the first antenna means and the second pilot symbols transmitted from the second antenna means of the transmitting device only as a combined or superimposed pilot symbol. In case that the first pilot symbol and the second pilot symbol transmitted in the same frequency subcarrier and the same timepoint are identical, the receiving device receives a combined pilot symbol comprising the superimposed identical first and second pilot symbol. In case that the first and second pilot symbol are orthogonal to each other, the receiving device receives a combined pilot symbol comprising the superimposed orthogonal first and second pilot symbol. In the receiving device, the transfer function of the first and the second pilot symbol, respectively, can therefore be separated so that the respective channel estimation for each of the two transmission antennas can be performed in a simple way.

Advantageously, the second pilot symbols alternatingly have the identical and the inverse complex value of the corresponding first pilot symbol in the time as well as in the frequency dimension, so that the processing and the channel estimation on the receiving side can be performed on a basis of a simple addition and subtraction calculation of the received pilot symbols. On the basis of the channel estimation result, both signals from the first antenna means and from the second antenna means of the transmitting device are further processed and used as the communication data in the receiving device.

The transmitting device according to the present invention can e.g. be implemented in the base station of an OFDM communication system or in a mobile terminal of an OFDM communication system.

BRIEF DESCRIPTION OF THE DRAWINGS

In the following description, the present invention is explained in more detail in relation to the enclosed drawings, in which.

DETAILED DESCRIPTION OF THE PREFERRED EMBODIMENTS

Figure 1:
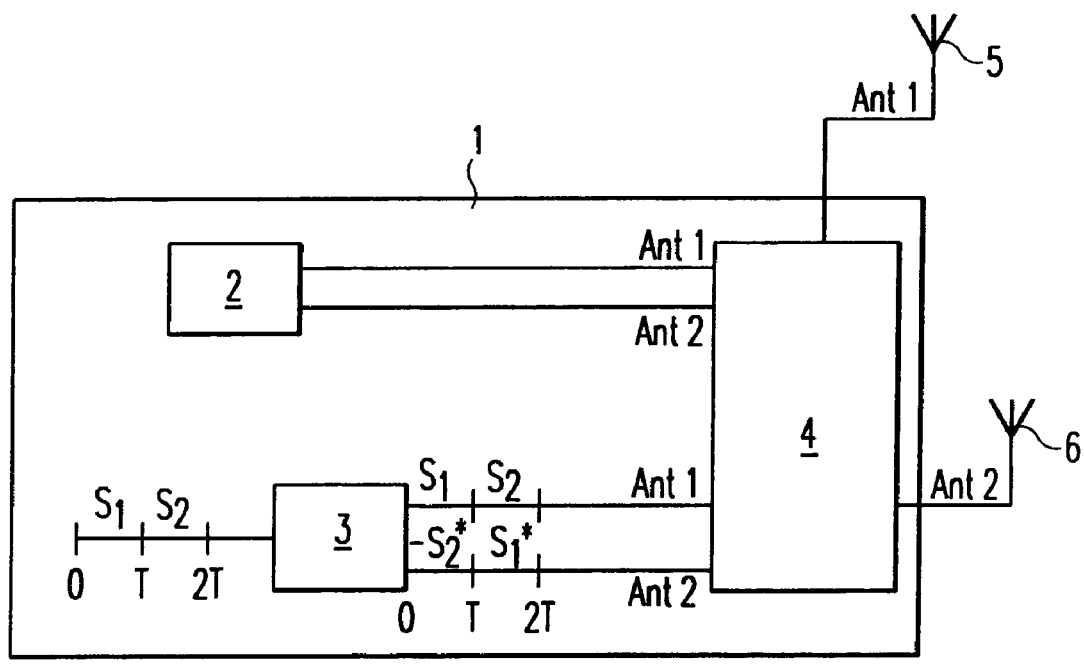
FIG. 1 shows schematically a base station comprising a transmitting device according to the present invention.

In FIG. 1, the block diagram of a base station 1 of a wireless orthogonal frequency division multiplex (OFDM) communication system is shown, which comprises a transmitting device according to the present invention. It is to be understood that in FIG. 1 only elements important for the understanding of the present invention are shown. Further elements, such as coding means, modulation means, RF part and the like necessary for the operation of the base station are omitted for the sake of clarity.

The base station 1 comprises a first antenna 5 and a second antenna 6 being arranged spaced apart from each other, e. g. in a space diversity arrangement. In this case, the first antenna 5 may also be called a non-diversity antenna and the second antenna 6 can also be called a diversity antenna. The space diversity arrangement of the first antenna 5 and the second antenna 6 is so that the two antennas 5 and 6 are sufficiently separated in space, so that the signals transmitted by the first antenna 5 and the second antenna 6, respectively, are uncorrelated and an effective diversity gain can be achieved on the receiving side.

Further, the base station 1 comprises a encoding means 3 for encoding a data stream, e. g. on the basis of a space time transmit diversity (STTD) scheme and outputting a first and a second STTD encoded data stream to a multiplexer 4. The first STTD encoded data stream is to be transmitted via the first antenna 5 and the second STTD encoded data stream is to be transmitted via the second antenna 6. Although the data transmitted from the first antenna 5 and the second antenna 6 are generally the same data, i.e. contain the data of the single data stream supplied to the encoding means 3, the data are not transmitted identically by the two antennas 5 and 6. For example, the data transmitted by the first antenna 5 identically correspond to the data arrangement of the single data stream supplied to the encoding means 3. If, e.g. a first data symbol $S_1$ in a time period 0-T and a second data symbol $S_2$ in the succeeding time period T-2T are supplied to the encoding means 3, the first data stream output by the encoding means can identically correspond to that arrangement (data symbol $S_1$ followed by data symbol $S_2$). The second data stream output by the encoding means 3, however, contains the data symbols $S_1$ and $S_2$ in a different arrangement. For example, as shown in FIG. 1, in the second data stream, the data symbol of the first time period 0-T could be the negative complex conjugated value of the second data block S2 of the first data stream, i.e. $-S^*_2$. The next succeeding data symbol of the second data stream is the conjugated complex value of the first data symbol $S_1$ of the first data stream, i.e. $S^*_1$. Thus, the second data stream contains the identical data content as the first data stream, but in a different arrangement. A receiving device receiving the signals from the first antenna 5 and the second antenna 6 as superimposed signals is therefore able to clearly distinguish between the signals transmitted from the first antenna 5 and the signals transmitted from the second antenna 6 due to the space diversity arrangement and the different arrangement of the same data content. It is to be understood that the space time transmit diversity scheme shown in and explained in relation to FIG. 1 only serves as an example to explain the present invention. Any other STTD scheme for transmitting data via the first antenna 5 and the second antenna 6 can be applied.

The base station 1 further comprises a pilot symbol generating means 2 for generating pilot symbols to be transmitted among the data of the first and the second data stream by the first antenna 5 and the second antenna 6. Thereby, the pilot symbol generating means 2 generates and supplies different pilot symbol patterns to be transmitted via the first antenna 5 and the second antenna 6, respectively, to the multiplexer 4. The general idea of the present invention is that some of the pilot symbols transmitted by the first antenna 5 and the second antenna 6 are orthogonal to each other so that the cross-interference from both antennas 5 and 6 is eliminated, the signals from the first, (non-diversity) antenna 5 and the second (diversity) antenna 6 can be differentiated and consequently a separate channel estimation for each antenna 5, 6 can be achieved in a receiving device.

Figure 2:
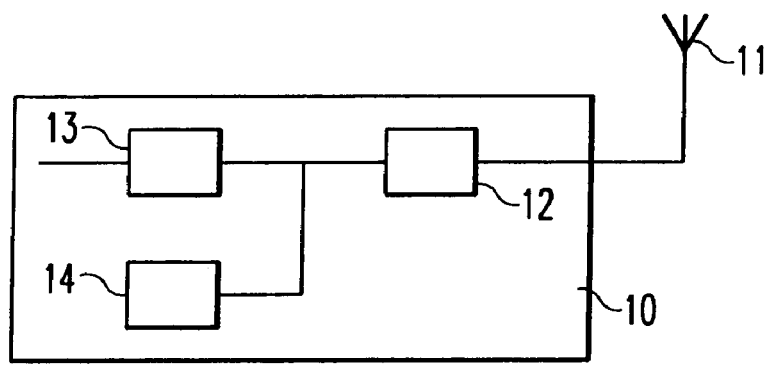
FIG. 2 shows schematically a mobile terminal comprising a receiving device according to the present invention, FIGS. 3A and 3B a first and a second example, respectively, of a pilot symbol pattern transmitted by a first antenna means of a transmitting device according to the present invention, and FIGS. 4A and 4B a first and a second example, respectively, of a pilot symbol pattern transmitted by the second antenna means of the transmitting device according to the present invention.

FIG. 2 shows a schematic block diagram of a mobile terminal 10 comprising a receiving device for receiving signals in a wireless OFDM communication system according to the present invention. Particularly, the mobile terminal 10 is adapted to receive signals from a base station 1 as shown in FIG. 1.

The mobile terminal 10 comprises a single antenna 11 for receiving STTD encoded signals as well as pilot symbols transmitted from the first antenna 5 and the second antenna 6 of the base station 1. Further, the mobile terminal 10 comprises a receiving means 12, which comprises e.g. the necessary RF part and the like. Further, the mobile terminal 10 comprises a demodulation means for demodulating signals received by the receiving means 12 via the antenna 11. It is to be understood that the mobile terminal 10 further comprises all necessary elements to be operated in the corresponding wireless OFDM system. However, these elements are not shown for the sake of clarity.

The mobile terminal 10 further comprises a processing means 14 for detecting pilot symbols in the signals received by the receiving means 12 via the antenna 11. The processing means 14 processes detected pilot symbols and performs a channel estimation on the basis of the processing to separately determine the transmission quality of the received signals transmitted from the first antenna 5 and the second antenna 6, respectively. In other words, by processing the received pilot symbols, which are combined pilot symbols comprising the first and the second pilot symbols simultaneously transmitted by the first antenna 5 and the second antenna 6, the processing means 14 is able to separately determine the transmission quality of the signals transmitted from the first antenna 5 and the transmission quality of the signals transmitted from the second antenna 6. On the basis of this channel estimation result, both the STTD encoded signals from the first antenna 5 and from the second antenna 6 are further processed and used as communication data in the mobile terminal 10.

As stated above, at least some of the second pilot symbols transmitted from the second antenna 6 are orthogonal to corresponding first pilot symbols transmitted by the antenna 5. The processing performed in the processing means 14 bases on this orthogonality of the first and the second pilot symbols and enables the separate channel estimation for the first and the second antenna 5 and 6, respectively. In relation to FIGS. 3 and 4, a specific example for pilot symbol patterns to be transmitted by the base station 1 and to be received and processed in the mobile terminal 10 are proposed.

FIG. 3 comprises two FIGS. 3A and 3B. FIG. 3A shows a first example of a pilot symbol pattern to be transmitted by the first (non-diversity) antenna 5 of the base station 1. The shown pilot symbol pattern has a regular distribution in the time and the frequency dimension of the OFDM system. The pilot symbols 20, 21, ..., 28 are always transmitted in the same frequency subcarriers and in equidistant timepoints. For example, the pilot symbols 20, 21 and 22 are transmitted in a first frequency subcarrier, whereby respectively four data symbols are transmitted between adjacent pilot symbols 20, 21 and 21, 22. Pilot patterns 23, 24 and 25 are transmitted in a second frequency subcarrier and the pilot symbol 26, 27 and 28 are transmitted in a third frequency subcarrier. Thereby, the pilot symbols 20, 23 and 26 are transmitted at the same first timepoint, the pilot symbols 21, 24 and 27 are transmitted in the same second timepoint and the pilot symbols 22, 25 and 28 are transmitted in the same third timepoint. Thus, always the same frequency subcarriers are used for the transmission of the pilot symbols and the transmission of the pilot symbols in the respective subcarriers always takes place at equidistant timepoints. Such a pilot symbol pattern is known from prior art OFDM systems. On the receiving side, the channel estimation for the data symbols between adjacent pilot symbols (in frequency and time) is performed by e.g. linear interpolation. For example, for the data symbols between the pilot symbols 20 and 21 in the same frequency subcarrier, a linear interpolation of the pilot symbols 20 and 21 is performed on the receiving side. For the data symbols between the adjacent pilot symbols 20 and 23 received at the same timepoint but in different frequency subcarriers, a linear interpolation is also performed. For data symbols in frequency subcarriers, in which no pilot symbols are transmitted, a combination of a time and a frequency interpolation of the respective adjacent pilot symbols is performed.

FIG. 3B shows also a regular distribution of the first pilot symbols to be transmitted by the first antenna 5 of the base station 1. The difference to the pilot symbol pattern of FIG. 3A is here that the (in time) succeeding pilot symbols are not transmitted in the same frequency subcarrier as the preceding pilot symbol, but in the immediately adjacent subcarrier. For example, the pilot symbol 31 is not transmitted in the same frequency subcarrier as the preceding pilot symbol 30, but the immediately adjacent (lower) frequency subcarrier. This pilot symbol pattern may allow a more accurate channel estimation for data symbols of frequency subcarriers, in which no pilot symbols are transmitted. Identical to the pilot symbol pattern proposed in FIG. 3A, the pilot symbols of the pilot symbol pattern proposed in FIG. 3B are also transmitted at identical timepoints. Thus, pilot symbols 30, 34 and 38 are transmitted at the first identical timepoint, pilot symbols 31, 35 and 39 are transmitted at the same second timepoint, pilot symbols 32, 26 and 40 are transmitted at the same third timepoint and pilot symbols 33, 37 and 41 are transmitted at the same fourth timepoint.

FIG. 4 comprises two FIGS. 4A and 4B, whereby FIG. 4A shows the pilot symbol pattern for the second pilot symbols to be transmitted by the second antenna 6 of the base station 1, which corresponds to the pilot symbol pattern of the first pilot symbols shown in FIG. 3A. As can be seen, also the pilot symbol pattern of FIG. 4A shows a very regular distribution of pilot symbols 42, 43, ..., 53 in frequency and time. The second pilot symbols are always transmitted in the same frequency subcarrier and at the same timepoint as the corresponding first pilot symbol. For example, the second pilot symbol 42 is transmitted in the same frequency subcarrier and at the same timepoint as the corresponding first pilot symbol 20. The second pilot symbol 43 is transmitted in the same frequency subcarrier and at the same timepoint as the first pilot symbol 21. The second pilot symbol 46 corresponds to the first pilot symbol 23, the second pilot symbol 50 corresponds to the first pilot symbol 26 and so on. Thereby, the second pilot symbols of the pilot symbol pattern in FIG. 4A are alternatingly identical and orthogonal to the corresponding first pilot symbols of the pilot symbol pattern shown in FIG. 3A. The second pilot symbols 42, 44, 47, 50 and 52 are identical to their corresponding first pilot symbols 20, 22, 24, 26 and 28. However, every other second pilot symbol (in time and frequency dimension) is the inverse complex value of the corresponding first pilot symbol. For example, a second pilot symbol 43 is the inverse complex value of the first pilot symbol 21, the second pilot symbol 46 is the inverse complex value of the first pilot symbol 23. The same is true for the second pilot symbol 48 and the first pilot symbol 25 and the second pilot symbol 51 and the first pilot symbol 27. Thus, pairs of adjacent second pilot symbols, as e.g. the second pilot symbols 42 and 43 as well as the second pilot symbols 42 and 46 are orthogonal to the corresponding pairs of the first pilot symbols, e.g. first pilot symbol 20 and 21 or first pilot symbol 20 and 23. Thus, orthogonality in the frequency as well as in the time dimension is ensured.

The same is essentially true for the pilot symbol pattern shown in FIG. 4B, which corresponds to the pilot symbol pattern shown in FIG. 3B. Similarly, the pilot symbols of the pilot symbol pattern shown in FIG. 4B are alternatingly identical and orthogonal (inverse complex) to the corresponding first pilot symbols shown in FIG. 3B.

The pilot symbol scheme proposed by the present invention can be applied to any linear channel estimation algorithm in wireless OFDM communications. For the sake of clarity, a simple two pilot symbol average based channel estimation algorithm for the pilot symbol patterns of FIG. 3A and FIG. 4A is used as an example in the following further detailed description.

Assuming that the complex values of all first pilot symbols 20, 21, ..., 28 and the corresponding second pilot symbols having the identical value, i.e. second pilot symbols 42, 44, 47, 50, 52, ..., is A. The complex value of the second pilot symbols 43, 46, 48, 51, ..., having a corresponding orthogonal value is then −A. For all the data symbols between the succeeding pilot symbols 20 and 21 or 42 and 43, respective channel estimation values for the first (non-diversity) antenna 5 and the second (diversity) antenna 6 should be obtained reliably so that the STTD scheme can be applied.

As stated above, the antenna 11 and the receiving means 12 of the mobile terminal 10 receive the first and the second pilot symbols as superimposed or combined pilot symbols. Thus, let $y_1$ and $y_2$ be the received values from the first 20, 21 and the second 42, 43 pilot symbols. Since the time delay between the first and the second antenna 5, 6 is negligible, the following equations are valid:

$$y_1 = A \times h_1^1 + A \times h_1^2 + n_1$$

and $$y_2 = A \times h_2^1 - A \times h_2^2 + n_2,$$

whereby $h_1^1$ is the channel transfer function from the first antenna 5 to the receiving antenna 11 for the first pilot symbol 20 with value "A", $h_1^2$ is the channel transfer function from the second antenna 6 to the receiving antenna 11 for the corresponding second pilot symbol 42 with value "A", $h_2^1$ is the channel transfer function from the first antenna 5 to the receiving antenna 11 for the first pilot symbol 21 with value "A", and $h_2^2$ is the channel transfer function from the second antenna 6 to the receiving antenna 11 for the corresponding second pilot symbol 43 with value "−A". $n_1$ and $n_2$ are the noise values. If $y_1+y_2$ is used as the channel estimation for the first (non-diversity) antenna 5 and $y_1-y_2$ is used as the channel estimation for the second (diversity) antenna 6, the signals from the first and the second antenna can be differentiated, the cross-interference can be eliminated and a reliable channel estimation for both antennas 5 and 6 can be obtained in the processing means 14 of the mobile terminal 10, if the channel transfer function is assumed to be kept fixed within the interval between the preceding and the succeeding pilot symbols across the time dimension, i.e. $h_1^1 = h_2^1$ and $h_1^2 = h_2^2$.

Thus, in the mobile terminal 10 the signals from the first and the second transmitting antenna 5, 6 can be differentiated and consequently a separate channel estimation for each antenna 5, 6 can be achieved. Since the pilot patterns of the first and the second pilot symbols are orthogonal, the cross-interference from the first and the second antenna 5 and 6, can be eliminated. Thus, a STTD scheme can be used in a high data rate OFDM wireless communication system. It is to be noted, that the idea of the present invention can also be applied to OFDM based broadband radio access networks (BRAN), like HIPERLAN Type 2 systems. In this case, the pilot symbols are transmitted in preamble parts of a respective data burst comprising a preamble part and a data part. The pilot symbols comprised in the respective preambles should be alternatively identical and orthogonal for the two transmitting antennas.

The invention claimed is:

1. A transmitting device for transmitting data symbols and pilot symbols in an OFDM transmission system, the device comprising:
symbol generating means for generating said data symbols and said pilot symbols, means for transmitting said data symbols and pilot symbols respectively by using a plurality of subcarriers of said OFDM transmission system,
wherein said symbol generating means is designed to selectively generate a first type pilot symbol and a second type pilot symbol being orthogonal to said first type pilot symbol so that a pilot symbol pattern in a frequency dimension comprises at least said first type pilot symbol to be transmitted by using a predefined subcarrier and second type pilot symbol to be transmitted by using another predefined subcarrier,
wherein said pilot symbol pattern has a different pattern in a time dimension from a succeeding pilot symbol pattern, and
wherein first pilot symbols are comprised in said pilot symbol pattern and second pilot symbols are comprised in said succeeding pilot symbol pattern, at least some of the first and second pilot symbols having a same time allocation and being alternately identical and orthogonal to each other.

2. A transmitting device according to claim 1,
wherein the first and the second pilot symbols have a regular distribution in the time and the frequency dimension, whereby the second pilot symbols alternately have identical and inverse complex value of the corresponding first pilot symbol in the time as well as in the frequency dimension.

3. A transmitting device for transmitting data symbols and pilot symbols in an OFDM transmission system, the device comprising:
symbol generating means for generating said data symbols and said pilot symbols, means for transmitting said data symbols and pilot symbols respectively by using a plurality of subcarriers of said OFDM transmission system,
wherein said symbol generating means is designed to selectively generate a first type pilot symbol and a second type pilot symbol being orthogonal to said first type pilot symbol so that a pilot symbol pattern in a frequency dimension comprises at least said first type pilot symbol to be transmitted by using a predefined subcarrier and second type pilot symbol to be transmitted by using another predefined subcarrier,
wherein said pilot symbol pattern has a different pattern in a time dimension from a succeeding pilot symbol pattern, and
wherein first pilot symbols are comprised in said pilot symbol pattern and second pilot symbols are comprised in said succeeding pilot symbol pattern, at least some of the first and second pilot symbols having a, same frequency allocation and being alternately identical and orthogonal to each other.

4. A transmitting device according to claim 1 or 3,
wherein corresponding first and second pilot symbols have the same frequency and time allocation in the OFDM system.

5. A transmitting device according to claim 4,
wherein corresponding first and second pilot symbols having the same frequency and time allocation are alternatingly identical and orthogonal to each other in the frequency as well as in the time dimension.

6. A transmitting device for transmitting data symbols and pilot symbols in an OFDM transmission system, the device comprising:
symbol generating means for generating said data symbols and said pilot symbols, means for transmitting said data symbols and pilot symbols by using a plurality of subcarriers of said OFDM transmission system,
wherein said symbol generating means is designed to selectively generate a first type pilot symbol and a second type pilot symbol being orthogonal to said first type pilot symbol so as to create a pilot symbol pattern in which said first and second type pilot symbols are allocated respectively in a frequency dimension,
wherein said pilot symbol pattern has a different pattern in a time dimension from a succeeding pilot symbol pattern,
wherein first pilot symbols are comprised in said pilot symbol pattern and second pilot symbols are comprised in said succeeding pilot symbol pattern, at least some of the first and second pilot symbols having a same time allocation and being alternately identical and orthogonal to each other.

7. A transmitting device for transmitting data symbols and pilot symbols in an OFDM transmission system, the device comprising:
  symbol generating means for generating said data symbols and said pilot symbols, means for transmitting said data symbols and pilot symbols by using a plurality of subcarriers of said OFDM transmission system,
  wherein said symbol generating means is designed to selectively generate a first type pilot symbol and a second type pilot symbol being orthogonal to said first type pilot symbol so as to create a pilot symbol pattern in which said first and second type pilot symbols are allocated respectively in a frequency dimension,
  wherein said pilot symbol pattern has a different pattern in a time dimension from a succeeding pilot symbol pattern, and
  wherein first pilot symbols are comprised in said pilot symbol pattern and second pilot symbols are comprised in said succeeding pilot symbol pattern, at least some of the first and second pilot symbols having a same frequency allocation and being alternately identical and orthogonal to each other.

8. A transmitting device according to claim 6 or 7,
  wherein corresponding first and second pilot symbols have the same frequency and time allocation in the OFDM system.

9. A transmitting device according to claim 8,
  wherein corresponding first and second pilot symbols having the same frequency and time allocation are alternatingly identical and orthogonal to each other in the frequency as well as in the time dimension.

10. A transmitting device according to claim 6 or 7,
  wherein the first and the second pilot symbols have a regular distribution in the time and the frequency dimension, whereby the second pilot symbols alternately have identical and inverse complex value of the corresponding first pilot symbol in the time as well as in the frequency dimension.

11. A transmitting device for transmitting data symbols and pilot symbols in an OFDM transmission system, the device comprising:
  symbol generating means for generating said data symbols and said pilot symbols, means for transmitting said data symbols and pilot symbols by using a plurality of subcarriers of said OFDM transmission system,
  wherein said symbol generating means is designed to regularly allocate either a first type pilot symbol or a second type pilot symbol being orthogonal to said first type pilot symbol in a frequency dimension to said generated pilot symbols, and wherein first pilot symbols are comprised in a first pilot symbol pattern and second pilot symbols are comprised in a second pilot symbol pattern, at least some of the first and second pilot symbols having a same time allocation and being alternately identical and orthogonal to each other.

12. A transmitting device for transmitting data symbols and pilot symbols in an OFDM transmission system, the device comprising:
  symbol generating means for generating said data symbols and said pilot symbols, means for transmitting said data symbols and pilot symbols by using a plurality of subcarriers of said OFDM transmission system,
  wherein said symbol generating means is designed to regularly allocate either a first type pilot symbol or a second type pilot symbol being orthogonal to said first type pilot symbol in a frequency dimension to said generated pilot symbols, and wherein first pilot symbols are comprised in a first pilot symbol pattern and second pilot symbols are comprised in a second pilot symbol pattern, at least some of the first and second pilot symbols having a same frequency allocation and being alternately identical and orthogonal to each other.

13. A transmitting device according to claim 11 or 12,
  wherein corresponding first and second pilot symbols have the same frequency and time allocation in the OFDM system.

14. A transmitting device according to claim 13,
  wherein corresponding first and second pilot symbols having the same frequency and time allocation are alternatingly identical and orthogonal to each other in the frequency as well as in the time dimension.

15. A transmitting device according to claim 11 or 12,
  wherein the first and the second pilot symbols have a regular distribution in the time and the frequency dimension, whereby the second pilot symbols alternately have identical and inverse complex value of the corresponding first pilot symbol in the time as well as in the frequency dimension.

16. A transmitting device for transmitting data symbols and pilot symbols in an OFDM transmission system, the device comprising:
  symbol generating means for generating said data symbols and said pilot symbols, means for transmitting said data symbols and pilot symbols respectively by using a plurality of subcarriers of said OFDM transmission system,
  wherein said symbol generating means is designed to selectively generate a first type pilot symbol and a second type pilot symbol being orthogonal to said first type pilot symbol so that a first pilot symbol pattern in a time dimension comprises at least said first and second type pilot symbols to be transmitted at different timepoints respectively,
  wherein a first pilot symbol pattern to be transmitted by using one of said plurality of subcarriers is different from a second pilot symbol pattern to be transmitted by using an adjacent subcarrier, and
  wherein first pilot symbols are comprised in said first pilot symbol pattern and second pilot symbols are comprised in said second pilot symbol pattern, at least some of the first and second pilot symbols having a same time allocation and being alternately identical and orthogonal to each other.

17. A transmitting device for transmitting data symbols and pilot symbols in an OFDM transmission system, the device comprising:
  symbol generating means for generating said data symbols and said pilot symbols, means for transmitting said data symbols and pilot symbols respectively by using a plurality of subcarriers of said OFDM transmission system,
  wherein said symbol generating means is designed to selectively generate a first type pilot symbol and a second type pilot symbol being orthogonal to said first type pilot symbol so that a first pilot symbol pattern in a time dimension comprises at least said first and second type pilot symbols to be transmitted at different timepoints respectively,
  wherein a first pilot symbol pattern to be transmitted by using one of said plurality of subcarriers is different from a second pilot symbol pattern to be transmitted by using an adjacent subcarrier, and wherein first pilot symbols are comprised in said first pilot symbol pattern and second pilot symbols are comprised in said second pilot symbol pattern, at least some of the first and second pilot symbols having a same frequency allocation and being alternately identical and orthogonal to each other.

18. A transmitting device according to claim 16 or 17,
  wherein corresponding first and second pilot symbols have the same frequency and time allocation in the OFDM system.

19. A transmitting device according to claim 18,
wherein corresponding first and second pilot symbols having the same frequency and time allocation are alternatingly identical and orthogonal to each other in the frequency as well as in the time dimension.

20. A transmitting device according to claim 16 or 17,
wherein the first and the second pilot symbols have a regular distribution in the time and the frequency dimension, whereby the second pilot symbols alternately have the identical and the inverse complex value of the corresponding first pilot symbol in the time as well as in the frequency dimension.

21. A transmitting device for transmitting data symbols and pilot symbols in an OFDM transmission system, the device comprising:
symbol generating means for generating said data symbols and said pilot symbols, means for transmitting said data symbols and pilot symbols by using a plurality of subcarriers of said OFDM transmission system,
wherein said symbol generating means is designed to selectively generate a first type pilot symbol and a second type pilot symbol being orthogonal to said first type pilot symbol so as to create a first pilot symbol pattern in which said first and second type pilot symbols are allocated regularly in a time dimension, wherein said first pilot symbol pattern to be transmitted by using one of said plurality of subcarriers is different from a second pilot symbol pattern to be transmitted by using an adjacent subcarrier, and
wherein first pilot symbols are comprised in said first pilot symbol pattern and second pilot symbols are comprised in said second pilot symbol pattern, at least some of the first and second pilot symbols having a same time allocation and being alternately identical and orthogonal to each other.

22. A transmitting device for transmitting data symbols and pilot symbols in an OFDM transmission system, the device comprising:
symbol generating means for generating said data symbols and said pilot symbols,
means for transmitting said data symbols and pilot symbols by using a plurality of subcarriers of said OFDM transmission system,
wherein said symbol generating means is designed to selectively generate a first type pilot symbol and a second type pilot symbol being orthogonal to said first type pilot symbol so as to create a first pilot symbol pattern in which said first and second type pilot symbols are allocated regularly in a time dimension, wherein said first pilot symbol pattern to be transmitted by using one of said plurality of subcarriers is different from a second pilot symbol pattern to be transmitted by using an adjacent subcarrier, and
wherein first pilot symbols are comprised in said first pilot symbol pattern and second pilot symbols are comprised in said second pilot symbol pattern, at least some of the first and second pilot symbols having a same frequency allocation and being alternately identical and orthogonal to each other.

23. A transmitting device according to claim 21 or 22,
wherein corresponding first and second pilot symbols have the same frequency and time allocation in the OFDM system.

24. A transmitting device according to claim 23,
wherein corresponding first and second pilot symbols having the same frequency and time allocation are alternatingly identical and orthogonal to each other in the frequency as well as in the time dimension.

25. A transmitting device according to claim 21 or 22,
wherein the first and the second pilot symbols have a regular distribution in the time and the frequency dimension, whereby the second pilot symbols alternately have identical and inverse complex value of the corresponding first pilot symbol in the time as well as in the frequency dimension.

26. A transmitting device for transmitting data symbols and pilot symbols in an OFDM transmission system, the device comprising:
symbol generating means for generating said data symbols and said pilot symbols, means for transmitting said data symbols and pilot symbols by using a plurality of subcarriers of said OFDM transmission system,
wherein a first pilot symbol pattern, in which a first type pilot symbol and a second type pilot symbol being orthogonal to said first type pilot symbol are allocated in a time dimension, to be transmitted by using one of said plurality of subcarriers is different from a second pilot symbol pattern to be transmitted by using an adjacent subcarrier, and
wherein first pilot symbols are comprised in said first pilot symbol pattern and second pilot symbols are comprised in said second pilot symbol pattern, at least some of the first and second pilot symbols having a same time allocation and being alternately identical and orthogonal to each other.

27. A transmitting device for transmitting data symbols and pilot symbols in an OFDM transmission system, the device comprising:
symbol generating means for generating said data symbols and said pilot symbols, means for transmitting said data symbols and pilot symbols by using a plurality of subcarriers of said OFDM transmission system,
wherein a first pilot symbol pattern, in which a first type pilot symbol and a second type pilot symbol being orthogonal to said first type pilot symbol are allocated in a time dimension, to be transmitted by using one of said plurality of subcarriers is different from a second pilot symbol pattern to be transmitted by using an adjacent subcarrier, and
wherein first pilot symbols are comprised in said first pilot symbol pattern and second pilot symbols are comprised in said second pilot symbol pattern, at least some of the first and second pilot symbols having a same frequency allocation and being alternately identical and orthogonal to each other.

28. A transmitting device according to claim 26 or 27,
wherein corresponding first and second pilot symbols have the same frequency and time allocation in the OFDM system.

29. A transmitting device according to claim 28,
wherein corresponding first and second pilot symbols having the same frequency and time allocation are alternatingly identical and orthogonal to each other in the frequency as well as in the time dimension.

30. A transmitting device according to claim 26 or 27,
wherein the first and the second pilot symbols have a regular distribution in the time and the frequency dimension, whereby the second pilot symbols alternately have identical and inverse complex value of the corresponding first pilot symbol in the time as well as in the frequency dimension.

* * * * *